Dec. 16, 1930. C. D. YOUNG 1,785,167
LOADING AND UNLOADING APPARATUS
Filed Sept. 17, 1928  2 Sheets-Sheet 1
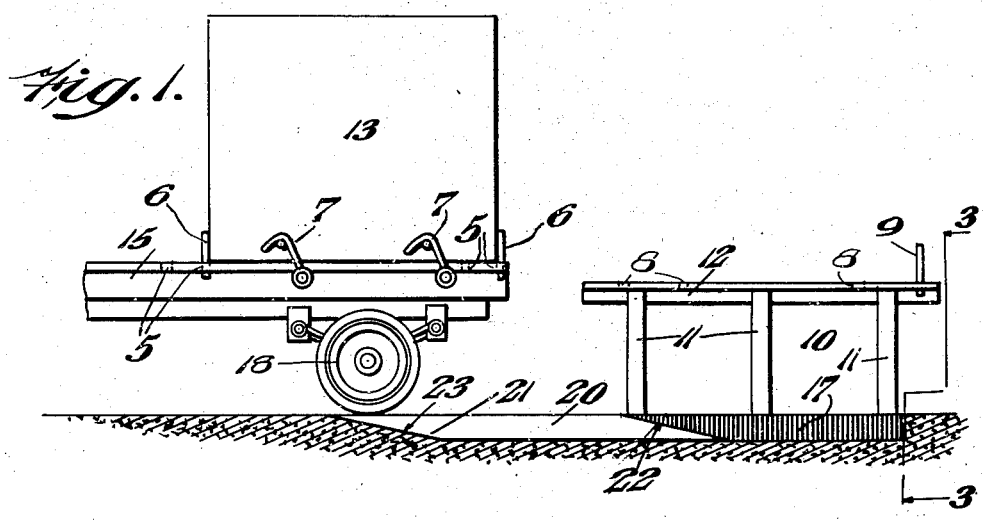
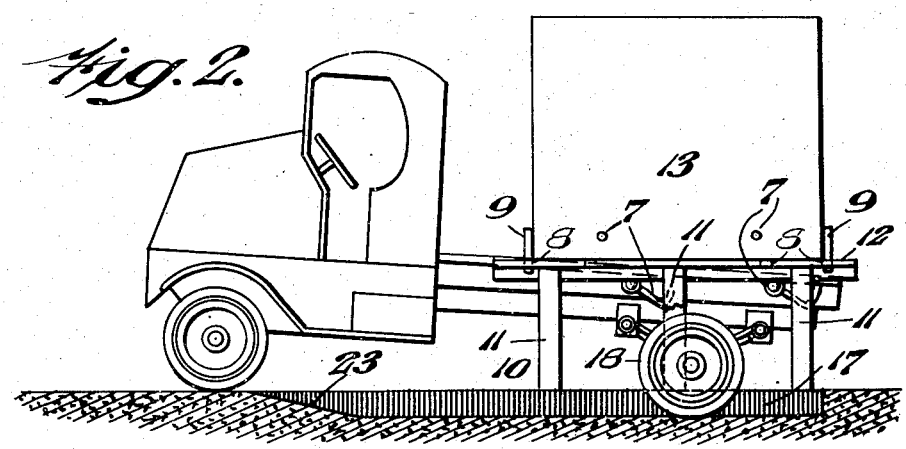
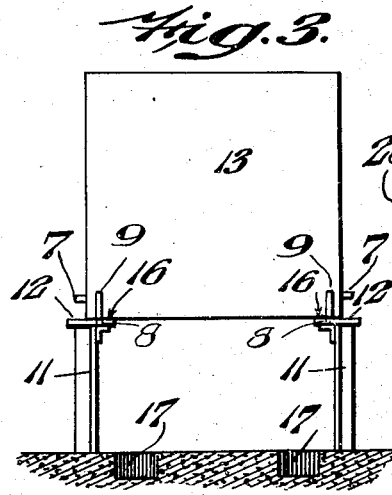
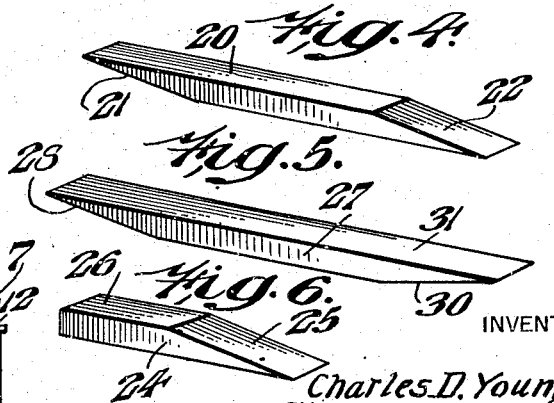
INVENTOR:
Charles D. Young,
BY
Robert M. Barr
ATTORNEY.

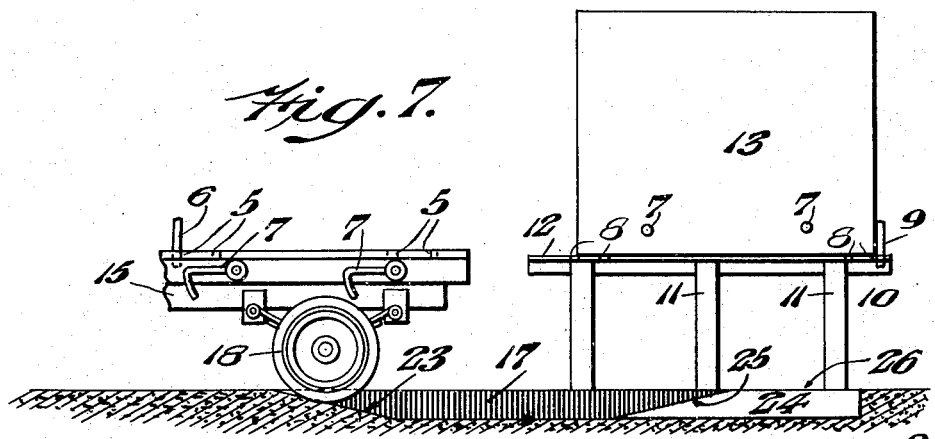
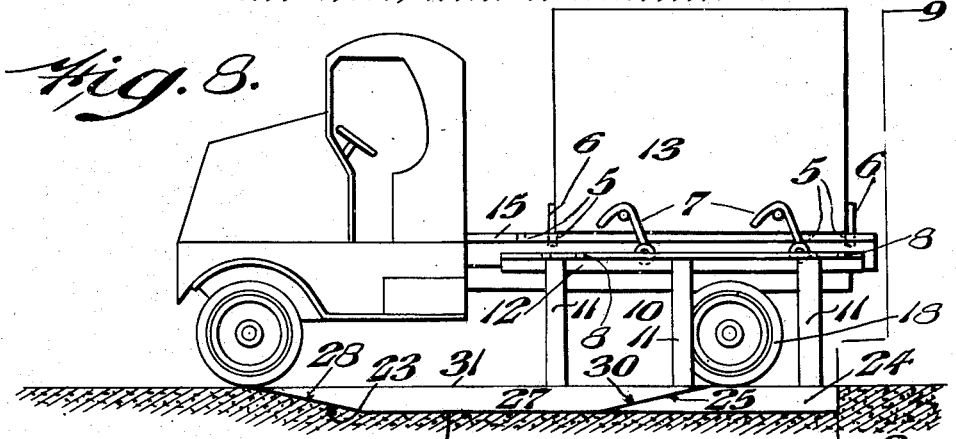
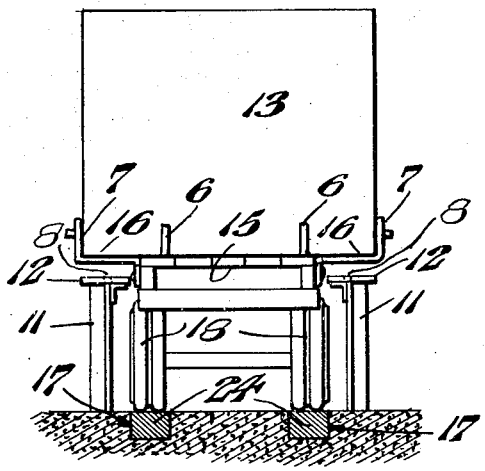
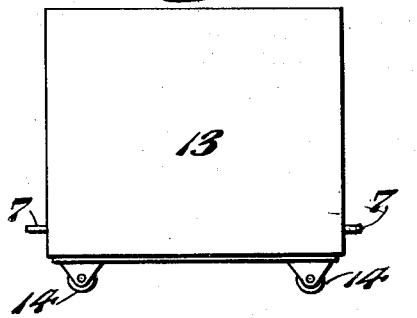

Patented Dec. 16, 1930

1,785,167

UNITED STATES PATENT OFFICE

CHARLES D. YOUNG, OF WAYNE, PENNSYLVANIA

LOADING AND UNLOADING APPARATUS

Application filed September 17, 1928. Serial No. 306,547.

The present invention relates to the transportation of merchandise and more particularly to the loading and unloading of containers which are transported from one terminal to another by automobile trucks.

Some of the objects of the present invention are to provide an efficient and economical system and apparatus for handling containers in which bulk shipments of merchandise and other commodities are to be transported; to provide an apparatus for transferring containers from a vehicle to a platform and vice versa without any manual handling of the containers; to provide an apparatus for transferring containers from a vehicle to a receiving platform and vice versa without employing overhead cranes or other mechanical or electrical hoisting mechanism; to provide a container handling apparatus wherein manual labor is reduced to a minimum; to provide a container transferring apparatus wherein the movement of a vehicle, such as a motor truck, automatically accomplishes the transfer of the container; and to provide other improvements as will hereinafter appear.

In the accompanying drawings, Fig. 1 represents a side elevation of a container handling apparatus embodying one form of the present invention and illustrating a truck bringing a container to the apparatus; Fig. 2 represents a side elevation of the same showing a container lifted from a truck body; Fig. 3 represents a section on line 3—3 of Fig. 1; Figs. 4, 5 and 6 respectively represent perspectives of different fillers for controlling operation of the system; Fig. 7 represents a side elevation of the apparatus with the parts in position preliminary to loading a container upon a truck; Fig. 8 represents a similar elevation with the parts in position to allow a loaded truck to leave the apparatus; Fig. 9 represents a section on line 9—9 of Fig. 8; and Fig. 10 represents a side elevation of another form of container.

Referring to the drawings, one form of the present invention includes a container receiving and supporting structure 10 consisting in the present instance of two parallelly arranged series of posts 11, both of the same height, and each series carrying a ramp rail 12 for supporting one side of a container 13. The containers 13 are usually of the type without wheels, but the system is not limited to such particular container but can with equal facility handle a container equipped with wheels 14 as shown in Fig. 10. The ramp rails 12 are so spaced as to permit a truck body 15 to enter between them but close enough together to be located beneath the respective side portions 16 of the bottom of the container. Also the tops of the two ramp rails 12 lie in a horizontal plane just below the plane of the floor of the truck body 15, and each top is provided with a hole 8 to receive a stop pin 9. Preferably each ramp rail has more than one of the holes 8 so that several positions of the pin 9 are possible and hence the container 13 can be located on the ramp rails in any predetermined position. The foregoing construction permits a truck to ride between the ramp rails 12 upon a plane ground level to bring its container above the top of the ramp rails 12 and into contact with the set stop pins 9. The containers 13 are arranged to be held on the truck body 15 by suitable pin and latch means 7 while stop pins 6 are provided to engage selected holes 5 in the floor of the truck to abut the respective front and rear ends of the container. These pins 6 serve also as a means for pushing against the container when transferring it from a truck to the ramp rails and vice versa. The latch means 7 ensures the container being held firmly upon the truck and prevents it from being jostled about while the truck is in transit over the highways.

In order to lower the floor level of the truck below the plane of the top of the ramp rails 12 so that the bottom of the container will be automatically deposited upon the ramp rails, the present invention provides two parallel slots or sunken trackways 17 respectively in alignment with the paths of the truck wheels 18 and along which the wheels 18 ride as the vehicle is backed toward the space between the ramp rails 12. The length of these trackways 17 is such as to allow the rear wheels of the vehicle to travel at the prepared low level until the rear end of the vehicle platform has cleared the ramp rails 2.

For bringing the bottom of a container 13 above the ramp rails 12 before the wheels 18 are lowered to the level of the trackways 17, two elongated filler blocks 20 are provided, one for each trackway 17 and each having the shape of a parallelogram, the angular inclined ends 21 and 22 of which serve in the case of end 21 to fit the blocks to the forward incline 23 of each of the trackways 17 and in the case of end 22 to provide downwardly disposed ways for gradually lowering the wheels to the bottom of the trackways. The length of these blocks 20 is such as to allow the vehicle to back into a position where the container sides are well over the ramp rails 12 before the wheels 18 reach the lowering incline ends 22. The height of the lowering filler blocks 20 corresponds to the depth of the trackways 17 so that when each is in its operating position its top face will be flush with the road level. The operative position of the blocks 20 is shown in Fig. 1 with a vehicle backing to unload a container 13 and when the wheels 18 ride down the inclines 22 and reach the trackway below the ramp rails 12, the truck pins 6 push the container 13 upon the rails 12 where it is supported instead of by the body of the truck. This container 13 can now be left in the position determined by the stop pins 9 by driving the vehicle out at the level of the trackway 17 which is done by removing the filler blocks 20 as shown in Fig. 2. By the time the wheels 18 reach the way inclines 23, the end of the vehicle body has cleared the container 13 and can therefore be returned to its normal level without interfering with the deposited container.

For the purpose of automatically loading a container 13 upon the vehicle body 15 two elevating filler blocks 24, each conforming generally to the depth and width of the trackway 17 it is to fit and having an inclined way 25 arranged to cause the wheels 18 to ride upwards from the bottom of the trackways 17 to the top 26 of the blocks 24. While the blocks 24 have been described as conforming to the configuration of the trackways 17 this is not of particular moment because the essential construction is to provide means for causing the wheels 18 to ride upwardly to a level which will ensure the platform of the vehicle engaging and lifting the container 13 from the ramp rails 12. The blocks 24 can be of various heights so that a pair can be selected to suit the particular load condition, and thus compensate for any difference in level in the truck body platform when carrying a loaded, or partly loaded, or empty container. By selecting blocks 24 of required height, a fixed level relationship can be maintained with respect to the platform 10 regardless of the depression of the truck springs.

In order that the truck may carry the container 13 with it as it leaves the space between the ramp rails 12, a levelling filler block 27 is provided having the two bottom end portions formed as inclines 28 and 30 tapering the ends of the block 27 towards the top face 31. When the truck or other vehicle has reached the position where its rear wheels 18 are on the elevating blocks 24 and the container 13 has been thus automatically removed from the rails 12 and seated upon the platform of the truck, the levelling blocks 27 are dropped into place in the respective trackways 17 with the face incline 28 seating upon the trackway incline 23, and the face incline 30 seating on the block incline 25. It will be understood that the length of this levelling filler block matches the length of the trackway which is unfilled by the elevating block 24. Thus with the blocks 27 in place, the two faces 31 are flush with the road level and with the top 26 of the blocks 24 so that the truck can drive out of the ramp rails 12 with the container 13 clearing the top of such rails. The latch means 7 is then engaged between the truck platform 15 and the container 13 in order to secure the container to the platform so that it will not be jostled from its position when moving over the uneven surfaces of the highways.

It will now be apparent that a complete automatically operable equipment has been devised for efficiently and economically loading and unloading containers upon vehicles, such as motor trucks and the like, and thereby increasing the handling facilities of freight while materially reducing the time of such handling. Furthermore all transferring movements of the containers are accomplished without the assistance of overhead hoisting apparatus such as cranes or chain hoists travelling on overhead trackways, and only the services of the truck driver are required. Thus for unloading a container, the driver merely places the two lower filler blocks 20 in place, and then backs the truck with container stops 6 in place between the ramp rails 12 until the position is reached where the wheels 18 reach the required low level to deposit the container upon the ramp rails 12 and against the ramp rail stops 9. The driver removes the two blocks 20 from the path of the wheels 18 and drives the vehicle away, leaving the container upon the support 10 at a predetermined location established by the stops 8. When loading a container, the driver places the two elevating blocks 24 in position within the two trackways 17, Fig. 7, and backs the vehicle along the trackway 17 until the block 24 raises the truck platform so that the container is lifted from the rails 12 and held horizontally in that position by the stops 6. With this accomplished, the driver places the two levelling blocks 27 into the respective trackways 17, Fig. 8, and then drives the truck away, carrying the container along with container stop pins 6 which have been placed properly in the platform 15.

Having thus described my invention, I claim:

1. A container handling apparatus comprising the combination of a vehicle for supporting a container, a fixed support for said container, a roadway having trackways for said vehicle leading to said support, and removable blocks respectively in said trackways to lower the supporting surface of said vehicle below the supporting level of said support whereby movement of said vehicle towards said support causes said surface to lower at a predetermined location and transfer said container to said support.

2. A container handling apparatus comprising the combination of a vehicle for supporting a container, a support for said container independent of said vehicle, a roadway having trackways for said vehicle leading to said support, and removable blocks respectivley in said trackways for cooperating with the wheels of said vehicle to lower the level of the supporting surface of said vehicle below the level of said support whereby movement of said vehicle towards said support with said blocks in place causes said surface to lower at a predetermined location and transfer said container to said support, while movement of said vehicle away from said support with said blocks removed causes said surface to be withdrawn from beneath the deposited container.

3. A container handling apparatus comprising the combination of a vehicle for supporting a container, a fixed support for said container, a roadway having trackways for said vehicle leading to and under said fixed support, and removable blocks located in said trackways beneath said support to elevate the supporting surface of said vehicle above the supporting level of said support whereby movement of said vehicle towards said support causes said surface to be elevated and lift a supported container from said support.

4. A container handling apparatus comprising the combination of a vehicle for supporting a container, a fixed support for said container, a roadway having trackways for said vehicle leading to and under said fixed support, removable blocks located in said trackways beneath said support to elevate the supporting surface of said vehicle above the supporting level of said support whereby movement of said vehicle towards said support causes said surface to be elevated and lift a supported container from said support, and a plurality of blocks arranged to be inserted respectively in abutting end relation to said elevating blocks to provide a continuous elevated surface leading away from said support whereby movement of said vehicle away from said support carries said container away.

5. A container handling apparatus comprising in combination a fixed support having a face to receive a container, a vehicle provided with a platform for transporting said container to or from said support, a roadway extending beneath said support and relatively spaced therefrom to cause said vehicle to travel throughout the length of said support with its platform below the face of said support and out of contact with a container on said support, and block members arranged to be placed on said roadway in the path of the wheels of said vehicle to elevate said platform above said support face for a part of the travel of said vehicle beneath said support.

6. A container handling apparatus comprising in combination a fixed support having a face to receive a container, a vehicle provided with a platform for transporting said container to or from said support, a roadway having a depression beneath said support to cause said vehicle to travel throughout the length of said support with its platform below the face of said support and out of contact with a container on said support, and block members insertable in said depression in the path of the wheels of said vehicle and of less length than said depression to elevate said platform above said support face for a part of the travel of said vehicle beneath said support.

7. A container handling apparatus comprising in combination a fixed support having a face to receive a container, a vehicle provided with a platform for transporting said container to said support, a roadway having a depression beneath said support to cause said vehicle to travel throughout the length of said support with its platform below the face of said support and out of contact with a container on said support, and block members insertable in said depression at the front end of said support in the path of the wheels of said vehicle and of less length than said depression to elevate said platform above said support face during the initial movement only of said vehicle beneath said support.

8. A container handling apparatus comprising in combination a fixed support having a face to receive a container, a vehicle provided with a platform for transporting said container from said support, a roadway having a depression beneath said support to cause said vehicle to travel throughout the length of said support with its platform below the face of said support and out of contact with a container on said support, and block members of less length than said depression and insertable in said depression adjacent the rear end of said support in the path of the wheels of said vehicle to elevate said platform above said support face during the initial movement of said vehicle from beneath said support.

9. A container handling apparatus comprising in combination a fixed support having a face to receive a container, a vehicle provided with a platform for transporting said container from said support, a roadway having a depression beneath said support to cause said vehicle to travel throughout the length of said support with its platform below the face of said support and out of contact with a container on said support, and supplemental block members also insertable in said depression for maintaining said platform above said support face during the remainder of the travel of said vehicle from beneath said support.

10. A container handling apparatus comprising in combination a support, a roadway under said support, a vehicle, and means for varying the contour of the roadway to vary the vertical relation between said vehicle and said support, said means being operably effective to different degrees during the respective movements of the vehicle relative to said support.

11. A container handling apparatus comprising in combination a support, a roadway under said support, a vehicle, and means presenting a variable contour for said roadway, said means being variable according to the direction of movement of the vehicle relative to said support.

12. A container handling apparatus comprising a support, a roadway under said support, a vehicle including a transporting platform arranged in cooperation with said roadway to load and unload to and from said support in a cycle of two movements, one a movement of the vehicle inward of the support and the other a movement outward of the support, and movable elements associated with said roadway to form a vertically variable surface to vary the vertical relation of said platform to said support, said surface being of different contour in one direction of movement of said vehicle from the other.

Signed at Philadelphia, county of Philadelphia, State of Pennsylvania, this 18th day of August, 1928.

CHARLES D. YOUNG.